July 2, 1963  C. C. ANTHES ETAL  3,095,921
BLOWPIPE
Original Filed July 17, 1958  2 Sheets-Sheet 1
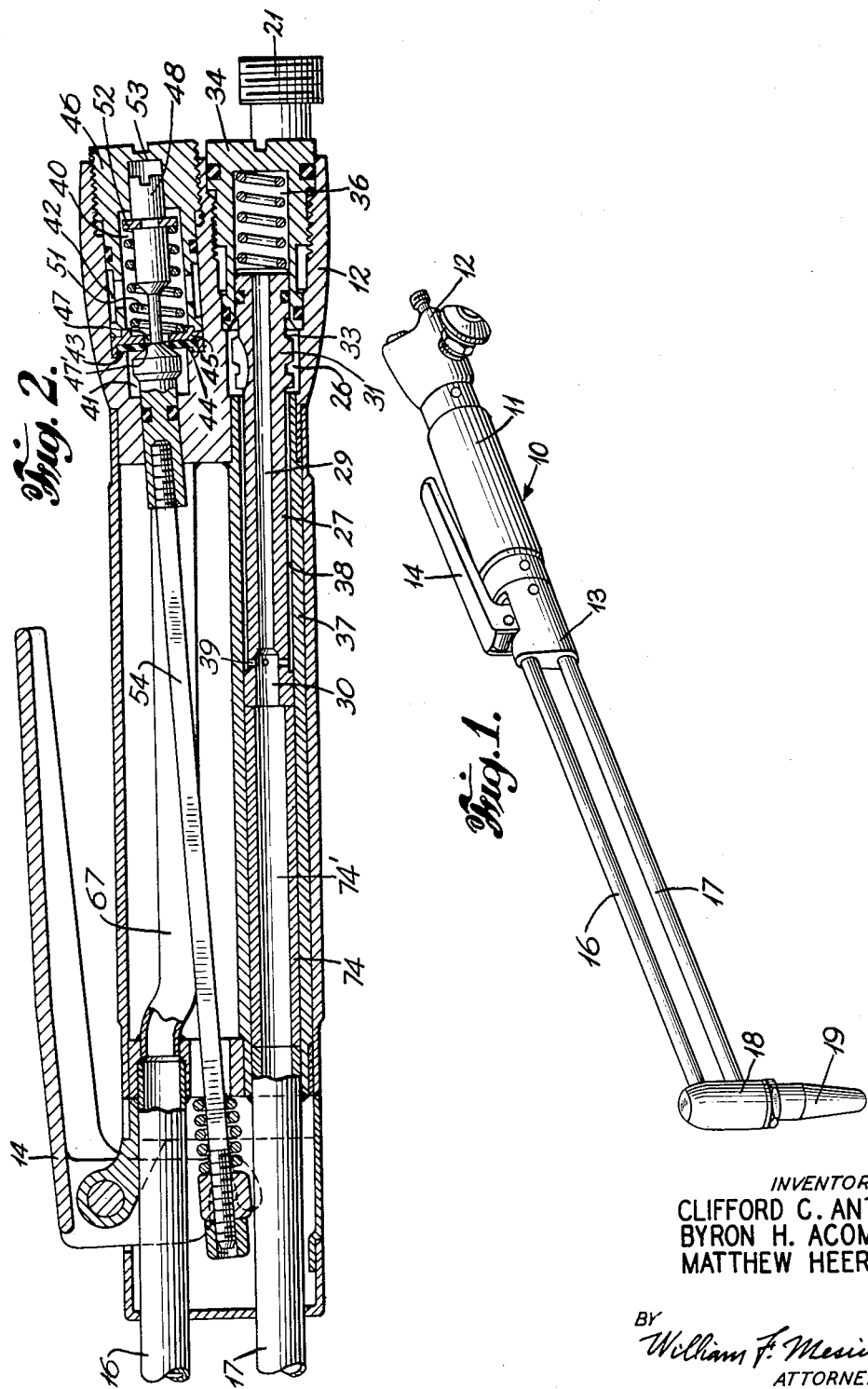
INVENTORS
CLIFFORD C. ANTHES
BYRON H. ACOMB
MATTHEW HEER, JR.
BY William F. Mesinger
ATTORNEY July 2, 1963  C. C. ANTHES ETAL  3,095,921
BLOWPIPE
Original Filed July 17, 1958
2 Sheets-Sheet 2
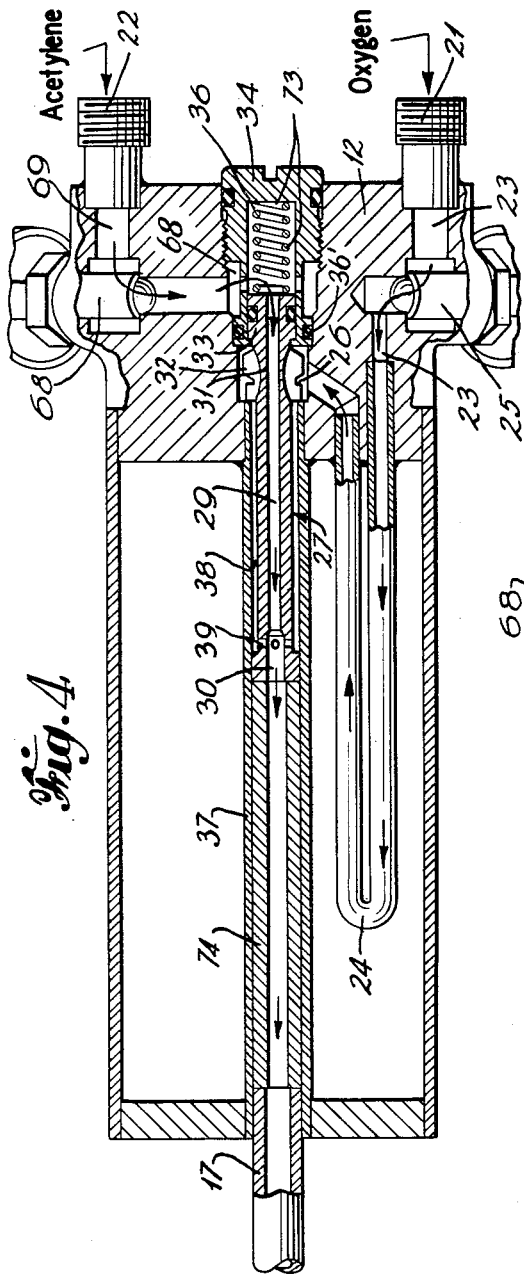
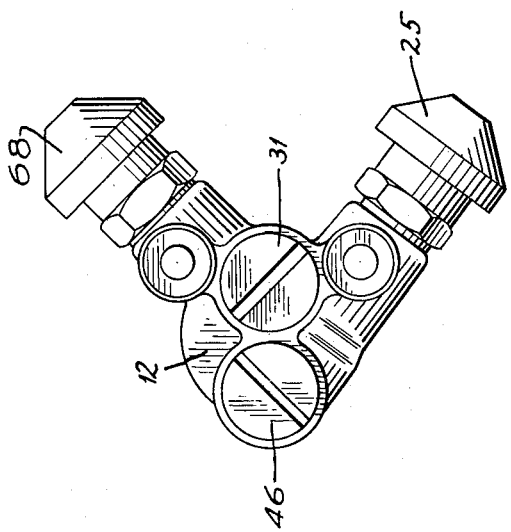
INVENTORS
CLIFFORD C. ANTHES
BYRON H. ACOMB
MATTHEW HEER, JR.
BY *William J. Mesinger*
ATTORNEY United States Patent Office 3,095,921
Patented July 2, 1963

3,095,921
BLOWPIPE
Clifford C. Anthes, Union, Byron H. Acomb, Watchung, and Matthew Heer, Jr., Basking Ridge, N.J., assignors to Union Carbide Corporation, a corporation of New York
Original application July 17, 1958, Ser. No. 749,292. Divided and this application Jan. 27, 1961, Ser. No. 85,273
5 Claims. (Cl. 158—27.4)

This invention relates to an improved blowpipe construction and more particularly to a gas mixer and mixing passage within the blowpipe which is substantially unaffected by flashback burning within the passage. This is a divisional of our parent application, Serial No. 749,-292 which was filed on July 17, 1958 and now abandoned.

In welding or cutting blowpipes of the type wherein a predetermined mixture of fuel gas and a combustion supporting gas, such as acetylene and oxygen are employed, the occurrence of flashback often results in damage to the blowpipe parts and generally poses serious problems. By flashback, as herein referred to, is meant the premature burning of a gas mixture at some point within the blowpipe rather than at the nozzle or tip where such burning should properly take place. Flashback not only interrupts the welding operation but frequently causes damage to such vital parts as the critically dimensioned gas mixer and its associated passage. These damaged parts are generally so positioned in a blowpipe as to be difficult to reach and replace with the result that any necessary repairing is time consuming and costly.

When the elongated gas mixer is subjected to flashback heating, the part most frequently expands radially in the mixer chamber but primarily it tends to expand in an axial direction. This thermal expansion, if permitted to any appreciable degree, will not only disturb the respective gas passages but in some instances will completely shut off such passages so that there will be no gas flow whatsoever.

It is therefore a principal object of the present invention to provide a blowpipe having improved features for mixing gases therein so as to substantially avoid or minimize flashback damage.

A further object is to provide a blowpipe having a gas mixer portion and associated throat section which are adapted to freely thermally expand when subjected to flashback heating and thereby avoid damage to the mixer and mixer chamber.

It is another object to provide a blowpipe of the type described which may be readily disassembled to replace portions of the gas mixer section in the event of damage to such parts.

Other objects, features, and advantages of the invention will be apparent from the following detailed description of a preferred embodiment of the invention in which:

FIG. 1 is an isometric view of a blowpipe embodying the principles of the present invention;

FIG. 2 is a view in cross section of the longitudinal section of the handle portion shown in FIG. 1;

FIG. 3 is an enlarged view looking at the rear end of the blowpipe shown in FIG. 1; and FIG. 4 is an enlarged view of the rear section of FIG. 1.

The blowpipe construction broadly contemplated by the present invention includes an apparatus used for either a welding or cutting operation. Gases which make up the combustible mixture are separably fed to the rear or handle portion of the blowpipe from suitable containers for storing said gases, which may be oxygen and acetylene. These gases are then mixed and conducted toward the blowpipe tip where they are ignited and directed against the workpiece as either heating flames or a cutting stream of oxygen. Intermediate the inlet and tip and preferably at the handle section the fuel gas and a portion of the combustion supporting gas are combined into a suitable combustible mixture. This mixing is carried out according to the present invention within an elongated conduit which surrounds and slideably positions a gas mixer. Immediately downstream of the mixer and positioned to receive the combustible gas mixture, an elonganted, temperature resistant throat member is disposed so as to closely fit within the conduit. When and if flashback occurs in the apparatus it will generally occur in the throat portion which is adapted to withstand excessive temperatures and in effect protect the mixer.

A more detailed description of a preferred embodiment of the invention may be had by reference to FIG. 1 which illustrates a blowpipe including an elongated tubular handle 11 having a valve block 12 attached to one end thereof. A front cap 13 engages the handle other end, and a valve lever 14 is pivotably connected to said front cap 13 and extends rearwardly parallel to the handle section 11. Dual gas conduits 16 and 17 extend forward from the front cap 13 and terminate in a common blowpipe head 18 which is provided with a nozzle 19 threadably fastened thereto.

The required fuel and combustion supporting gases are introduced to the blowpipe at the valve block 12 which is provided with a threaded oxygen inlet 21 and a threaded acetylene inlet 22 as shown in FIG. 4, adapted to receive suitably threaded gas hose couplings. Although various gases may be used in the apparatus, for clarity, the invention will be described using oxygen as the combustion supporting gas and acetylene as the fuel gas.

The oxygen serves two purposes; a portion of said gas is mixed with a measured amount of acetylene to form a combustible mixture that is burned to provide a heating flame. The remaining gas is used in the cutting operation as an oxidizing agent.

Oxygen to be mixed with the acetylene, as shown in FIG. 4, enters the oxygen inlet 21 and flows through passage 23 to a reverse bend tube 24. Within passage 23 a manually operated oxygen control valve 25 is interposed for adjustably regulating the flow of gas to the blowpipe. The reverse bend tube 24 terminates in an annular oxygen chamber 26.

Referring to FIGS. 2 and 4, the annular oxygen chamber 26 is traversed by a gas mixer 27. This mixer comprises a cartridge shaped elongated tubular member having an axial passage 29 which communicates with a source of acetylene or other gas. Said passage 29 consists of an inlet end and a forwardly disposed mixing chamber 30. There is thus provided a gas passage for conducting acetylene to the mixer chamber 30 from the acetylene chamber to be herein described.

An intermediate portion 31 of the mixer is positioned within and substantially coaxial with the annular oxygen chamber 26. A plurality of slots 32 formed into said intermediate portion, define longitudinal passages through which oxygen gas may pass from said chamber 26 and toward the forwardly disposed mixing chamber 30.

The rear cylindrical portion 33 of the mixer 27 extends into and is slideably received in an open ended bore 36 of a threaded plug 34. An annular seal ring encircling said rear portion 33 provides a slideable fit with recess 36, the latter consisting the previously mentioned acetylene chamber.

The elongated tubular portion of the mixer 27 fits within the tube 37. Just sufficient clearance is provided between the tube inner wall and the mixer forward end to allow a free sliding movement of the mixer within said wall when the latter thermally expands. A peripheral clearance about the mixer provides an annular passage 38 which communicates the annular oxygen chamber 26 with mixing chamber 30. Through a plurality of radially spaced, constricted oxygen ports 39 whereby the rapidly flowing, radially impinging jets of oxygen may enter chamber 30 and mix with the forward flowing acetylene stream.

With reference to FIG. 2, cutting oxygen, which constitutes a major portion of gas admitted to the blowpipe, is directed from inlet 21 to a cutting oxygen supply chamber 40 by means of a connecting passage 40 extending therebetween.

The flow of cutting oxygen passing to the blowpipe nozzle 19 is externally controlled by the lever 14. Said lever is in turn linked to a flow control valve which, by virtue of its operating means may be either fully open or fully closed in accordance with the position of lever 14. While generally such blowpipe valves are usually non-adjustable as to the allowable flow of oxidizing gas which may flow therethrough, a valve and actuating linkage is here provided which allow a desired rate of cutting oxygen to be obtained by presetting the valve linkage.

Referring to FIG. 2, the valve body 12 is provided with a recess comprising a pair of concentric bores 41 and 42 having a shoulder 43 therebetween. A resilient seat 44 is positioned against said shoulder 43 by an adjacent retaining ring 45. A plug 46 threadably inserted in the larger bore 42 compressively positions said seat 44 and ring 45 against the shoulder 43. Aligned central openings 47 and 47' through said seat and ring, encircle an extended portion of a valve stem 48. A spring 51 and spring retainer 52 are positioned on said stem and coact to urge the valve stem 49 rearwardly thereby forcing the stem into compressive gas tight contact with the valve seat 44.

The threaded plug 46 is provided, as herein mentioned, with a central recess which defines the oxygen chamber 40, and is also provided with a smaller counter bore 53 adapted to slideably support the rear portion of valve stem 48. Oxygen flow from chamber 40 to the adjacent chamber defined by bore 41 is obtained by lifting the valve stem 48 from the seat member 44. A passage communicating said chamber 41, while not shown in the drawing, conducts cutting oxygen from chamber 41 into tube 67, and thence to tube 16. This lifting action is accomplished by means of the pull rod 54 operably engaged with said valve stem and forwardly linked through the linkage mechanism to the external lever 14.

When in the course of a cutting operation, a stream of cutting oxygen is required at the blowpipe nozzle 19, downward actuation of lever 14 will place the valve stem 48 in a forward position, thereby permitting oxygen to flow from chamber 40 to the adjacent chamber 41 and thence, through the connected tubes 67 and 16, to the blowpipe head 18.

Acetylene for the combustible gas mixture is introduced to the blowpipe at valve block 12 by means of inlet 22. As shown in FIG. 4, acetylene upon entering valve block 12 flows through passage 69 in which control valve 68 is interposed. This valve, similar to the previously mentioned oxygen control valve 25, is manually operable to obtain a desired combustible gas mixture at the blowpipe nozzle. Passage 69 terminates in an annular acetylene chamber 68' formed by a circumferential groove on the outer surface of plug 34. A plurality of radial passages extending through the wall of said plug 34 admit acetylene to the central chamber 36 from whence it may enter the mixer passage 29 and be conducted forward to the mixing chamber 30. A resilient packing ring 36' retained on the forward end of plug 34, gas tightly separates the oxygen chamber 26 from acetylene chamber 36 to prevent mixing of the two gases prior to their entry into the mixing chamber 30.

The acetylene chamber 36, as shown, is provided with a compressed spring 73, one end of said spring being positioned in abutting contact with the rear wall of chamber 36, the other end of the spring positioned to forwardly urge the mixer 27. As may be seen in FIGS. 2 and 4, the mixer 27 thus maintained is held in spring loaded abutting contact with a forwardly disposed cylindrical throat 74. This throat is slideably retained within the tube 37 and positioned against a rearwardly facing annular shoulder of the fixed tube 17.

The throat 74, according to the invention, comprises a tubular member made from a heat-resisting, low heat conductive material such as nickel, silver, and is preferably designed to maintain a very slight contact with the surrounding tube 37 thereby minimizing the amount of heat which will be conducted to said tube in the event of flashback burning. A passage or passages 74' extending longitudinally through the throat is positioned to receive a flow of combustible gas mixture from the forward end of the mixing chamber 30.

By virtue of its position forward of the mixing chamber 30, any sustained burning of the combustible gas mixture, due to blowpipe flashback will in most instances, take place within the throat section 74. While such burning, due to the intense heat, will tend to thermally expand the throat both radially and longitudinally, the latter expansion is readily accommodated by the spring loaded floating mixer 27 which will be urged rearwardly into chamber 36. When the throat subsequently contracts upon cooling, the spring 73 will continue to hold the mixer and throat in abutting contact thereby maintaining the continuous gas passage to tube 17.

By the unique arrangement of the disclosed high temperature resisting throat and spring loaded mixer, any damage to the critically dimensioned mixer due to flashback of the gas mixture is largely avoided and directed instead to the more expendable throat. It is readily seen that the relative positioning of these parts provides a form of mutual protection whereby they may cooperatively shift position within the enclosing tube 37 without interrupting the flow of gas to tube 17.

A distinct advantage obtained by use of the present invention is the coaxial relationship of the mixer 27 and the throat 74 within the rearmost section of the blowpipe. This disposition greatly facilitates the removal or changing of such parts as required. Ordinarily, when occasion arises to change the mixer 27 or throat 74 due to bending or thermal damage, the unthreading of plug 34 from its recess will permit said parts to be withdrawn from their position. Should either part, due to heat distortion, bind or become fastened within tube 37, it is a rather simple matter to forcibly eject such part with the aid of an appropriate tool. This feature of easy interchangeability is particularly advantageous and desirous when it becomes necessary to change the floating mixer with any degree of regularity in order to provide the blowpipe with a different gas capacity for a particular job.

A further advantage realized by use of the throat and floating mixer, is that due to the minimized area of contact between said throat and enclosing tube, the tube 37 will not generally be warped or damaged to the extent of requiring replacement as has been the case previously.

It is to be understood that certain modifications and variations may be effected in the described blowpipe without departing from the spirit and scope of the invention.

What is claimed is:

1. A blowpipe comprising in combination, a gas conduit, a tube positioned downstream of said conduit to receive a flow of a combustible gas mixture, a high temperature resistant tubular throat disposed in said conduit, the forward end of said throat positioned at the downstream end of said conduit, a cylindrical gas mixer disposed upstream of said tubular throat in slideable relation to said conduit, said mixer including a gas mixing chamber having an inlet and an outlet, a passage means communicating said mixing chamber with a supply of fuel gas, and a second passage means communicating said chamber with a supply of combustion supporting gas, the outlet of said mixing chamber positioned adjacent the upstream end of said tubular throat to provide a flow of a combustible gas mixture to said throat, and means for resiliently urging said throat and mixer longitudinally into said conduit providing a continuous gas passage therebetween, whereby thermal expansion and contraction of said throat due to flashback burning of the combustible mixture therein will result in free longitudinal movement of the throat and mixer along the conduit subject to urging of said resilient means.

2. A blowpipe comprising in combination, a conduit, a tube positioned downstream of said conduit and in communication therewith to receive a flow of a combustible gas mixture, a high temperature resistant throat having a diameter slightly smaller than the inside wall diameter of said conduit, said throat being loosely positioned at the forward end of said conduit to allow relative axial movement between the conduit wall and the throat upon thermal expansion and contraction of the latter, a longitudinal bore transversing the throat length defining a passage therethrough for said combustible gas mixture, a cylindrical gas mixer positioned upstream of said throat in slideable relationship with the said conduit, said mixer comprising a gas mixing chamber having an inlet and an outlet, a passage means communicating said chamber with a supply of combustible gas, a second passage means communicating said chamber with a supply of a combustion supporting gas, said chamber being in communication with the throat to deliver a flow of combustible gas mixture to the bore extending therethrough, and spring means urging said throat and mixer forwardly into said conduit to provide gas tight engaging contact therebetween.

3. A blowpipe comprising in combination, a tube having one end adapted to receive a flow of a combustible gas mixture, an elongated conduit communicating with the tube at said one end defining a shoulder means at the forward end, an elongated tubular throat slideably positioned in said conduit the forward end of said throat disposed in abutting engagement with said shoulder means, a gas mixer positioned in slideable axial relationship with said conduit upstream of said throat, a mixing chamber at the forward end of said gas mixer in communication with the tubular throat to deliver a flow of the combustible gas mixture thereto, means in said mixer for supplying said mixer chamber with a flow of combustible gas, means for providing the mixing chamber with a combustion supporting gas, sealing means gas tightly separating said respective gas passages, and spring means urging said gas mixer forwardly into the conduit against said tubular throat, whereby flashback burning of the combustible gas mixture in the throat section causing thermal expansion thereof will rearwardly urge the mixer against said spring means to maintain the gas passage between said throat and mixer and permit longitudinal movement thereof during periods of said thermal expansion and contraction.

4. In a blowpipe, the combination with an elongated handle section having a front cap, and rear valve block including a first and second aligned tubular chambers, a tube extending forwardly of said front cap and having the rear portion thereof received in the front cap for conducting a combustible gas mixture, a conduit having an inner diameter greater than the inner diameter of said tube extending between the front cap and a valve block in communication with said tube and defining an annular abutment at the tube rear end, a high temperature resistant tubular throat located substantially coaxial of said conduit in slideable relation therewith, one end of said throat positioned against said annular abutment to prevent forward movement thereof, the said throat being rearwardly expandable when subjected to thermal expansion due to flashback burning of the combustible gas mixture, an elongated gas mixer positioned in slideable coaxial relation with said conduit, said mixer having a gas mixing chamber at the forward end thereof in communication with the tubular throat for delivering a flow of combustible gas mixture to said throat, the rear portion of said mixer transversing said valve block first tubular chamber and slideably supported in the valve block second tubular chamber, means encircling said mixer providing a sliding gas tight annular seal between said first and second chambers, means in said mixer communicating said second chamber with the mixing chamber to provide a flow of combustible gas thereto, means communicating the first chamber with the mixing chamber to provide a flow of combustion supporting gas, and a spring compressively disposed in said second chamber urging the mixer forward against the throat to maintain a continuous gas passage therebetween during periods of longitudinal expansion and contraction of said throat when subjected to flashback burning.

5. In a blowpipe, the combination with an elongated handle section having a front cap and a rear valve block including a first and second aligned tubular chambers, a tube extending forwardly of said front cap for conducting a combustible gas mixture, a conduit in said handle extending between the front cap and valve block in communication with said tube, abutting means at the forward end of said conduit, a high temperature resistant tubular throat located substantially coaxial with said conduit in slideable relation therewith, one end of said throat longitudinally positioned against said annular shoulder, the other end thereof being rearwardly expandable when said throat is subjected to thermal expansion due to flashback burning of the combustible gas mixture in said throat, a gas mixer positioned slideably in said conduit defining an annular passage therebetween, said mixer having a mixing chamber at the forward end thereof in communication with the tubular throat to deliver a flow of combustible gas thereto and a rear portion spaced longitudinally from said mixing chamber, the mixer forward portion slideably supported in said conduit, the mixer rear portion slideably and gas tightly supported at the valve block second tubular chamber transversing the first of said aligned chambers to communicate said first chamber with said annular passage, an axial passage extending longitudinally of said mixer communicating said second chamber with the mixing chamber, a resilient seal ring surrounding the mixer rear portion and deformed against said second chamber wall providing a gas tight seal therewith, and a spring compressively retained by the second chamber in abutment with the mixer rear portion thereby urging the mixer forward against the throat to maintain a continuous gas passage therebetween during periods of longitudinal expansion and contraction of said throat when subjected to flashback burning.

References Cited in the file of this patent
UNITED STATES PATENTS 2,459,881     Jacobsson _____ Jan. 25, 1949